United States Patent [19]

Watanabe et al.

[11] Patent Number: 4,753,786
[45] Date of Patent: Jun. 28, 1988

[54] METHOD FOR PRODUCING GRAPHITE FLUORIDE

[75] Inventors: Nobuatsu Watanabe, Nagaokakyo; Tsuyoshi Nakajima, Kyoto; Rika Hagiwara, Annaka, all of Japan

[73] Assignee: Nobuatsu Watanabe, Kyoto, Japan

[21] Appl. No.: 10,372

[22] Filed: Feb. 3, 1987

Related U.S. Application Data

[63] Continuation of Ser. No. 797,320, Nov. 12, 1985, abandoned.

[30] Foreign Application Priority Data

Nov. 12, 1984 [JP] Japan ................. 59-236852

[51] Int. Cl.$^4$ .......................... C01B 31/30; C01B 9/08
[52] U.S. Cl. .................................. 423/439; 423/489
[58] Field of Search ................. 423/439, 489; 429/218

[56] References Cited

U.S. PATENT DOCUMENTS

| | | | |
|---|---|---|---|
| 3,536,532 | 10/1970 | Watanabe et al. | 429/194 |
| 3,567,618 | 3/1971 | Foulletier et al. | 429/218 |
| 3,700,502 | 10/1972 | Watanabe et al. | 429/218 |
| 3,922,174 | 11/1975 | Heller | 429/218 |
| 4,247,608 | 1/1981 | Watanabe et al. | 429/194 |
| 4,271,242 | 6/1981 | Toyoguchi et al. | 429/218 |
| 4,584,252 | 4/1986 | Touzain et al. | 429/209 |

FOREIGN PATENT DOCUMENTS

| | | | |
|---|---|---|---|
| 0051709 | 4/1980 | Japan | 423/439 |
| 8200396 | 4/1983 | Japan | 423/439 |

OTHER PUBLICATIONS

Chemistry and Physics of Carbon, Walker et al., Marcel Dekker, Inc., 1975, vol. 12, p. 51.
Modern Aspects of Graphite Technology, L.C.F. Blackman, Academic Press, 1970, pp. 121, 274–275.
Encyclopedia of Chemical Technology, 3rd Ed. John Wiley & Sons, Inc, 1978, vol 4, p. 697.

*Primary Examiner*—Robert L. Stoll
*Assistant Examiner*—Adriana L. Mui
*Attorney, Agent, or Firm*—Sprung, Horn, Kramer & Woods

[57] ABSTRACT

There is disclosed a method for producing a graphite fluoride for use in an electrochemical cell of the type having as the negative electrode a light metal, such as an alkali metal, an electrolyte in which the negative electrode is not dissolved, and a positive electrode which has, as an active material, a graphite fluoride produced by fluorinating a decomposition residual carbon which has been obtained by decomposing a covalent intercalation compound. The electrochemical cell of the present invention exhibits high discharge potential and low overvoltage, and excellent discharge characteristics with respect to the flatness of discharge voltage, discharge capacity and shelf-life.

3 Claims, 19 Drawing Sheets

2θ,°

METHOD FOR PRODUCING GRAPHITE FLUORIDE

This application is a continuation of application Ser. No. 797,320, filed Nov. 12, 1985, now abandoned.

This invention relates to an electrochemical cell. More particularly, the present invention is concerned with an electrochemical cell of the type having as the negative electrode a light metal, such as an alkali metal, and an electrolyte in which the negative electrode is not dissolved. The electrochemical cell of the present invention is characterized in that the positive electrode has, as an active material, a graphite fluoride produced by fluorinating a decomposition residual carbon which has been obtained by decomposing a covalent graphite intercalation compound. The electrochemical cell of the present invention is extremely excellent in not only discharge potential and discharge capacity but also flatness of discharge potential.

With respect to a graphite fluoride to be used as an active material for the positive electrode of an electrochemical cell, there have conventionally known two types of graphite fluorides, namely, $(CF)_n$ and $(C_2F)_n$ (see, for example, U.S. Pat. Nos. 3,536,532 and 4,247,608). Electrochemical cells of $(CF)_n$ and $(C_2F)_n$ each have advantages on one hand, and have drawbacks on the other hand. Illustratively stated, the former has an advantage that the discharge capacity is large because the fluorine content is high. However, the former has disadvantages that the overvoltage is high and the discharge potential is not sufficient and that the production of $(CF)_n$ is inevitably and disadvantageously accompanied by decomposition and, therefore, it is difficult to produce $(CF)_n$ in high yield. On the other hand, the latter has advantages that $(C_2F)_n$ can be advantageously produced in a yield as high as 100% and that the overvoltage is low and the discharge potential is high. However, the latter has a disadvantage that the discharge capacity is smaller than that of the former because the fluorine content of $(C_2F)_n$ is a half, in mole, that of $(CF)_n$. Hereinafter, the advantages and disadvantages of $(CF)_n$ and $(C_2F)_n$ will be explained in detail.

The graphite fluoride is a high molecular polycrystalline compound and has not been obtained in the form of a single crystal. With respect to electrochemical cells of $(CF)_n$ and $(C_2F)_n$ in which there are respectively used $(CF)_n$ and $(C_2F)_n$ having relatively high crystallinity, the discharge characteristics are described below.

1. The open circuit voltage (hereinafter often referred to as "OCV") of the electrochemical cell of $(CF)_n$ is almost the same as that of electrochemical cell of $(C_2F)_n$, that is, about 3.2 to 3.3 V vs Li in 1 M $LiClO_4$-propylene carbonate.

2. The overvoltage of the electrochemical cell of $(C_2F)_n$ is lower than that of the electrochemical cell of $(CF)n$. [The reason for this is that lithium ions can be easily moved between the layers of graphite fluoride crystal because, for example, the crystallite size of $(C_2F)_n$ in the direction of a c-axis is smaller than that of $(CF)_n$ in the direction of a c-axis.]That is, the discharge potential of the electrochemical cell of $(C_2F)_n$ is higher than that of the electrochemical cell of $(CF)_n$.

3. The discharge capacity of the electrochemical cell of $(CF)_n$ is larger than that of the electrochemical cell of $(C_2F)_n$. [Theoretical discharge capacities of the electrochemical cell of $(CF)_n$ and the electrochemical cell of $(C_2F)_n$ are 860 mAh/g and 700 mAh/g, respectively. The reason for this is that the fluorine content of $(CF)_n$ is higher than that of $(C_2F)_n$.]

Further, both the electrochemical cell of $(CF)_n$ and the electrochemical cell of $(C_2F)_n$ generally have the following discharge characteristics:

4. The higher the crystallinity of $(CF)_n$ or $(C_2F)_n$, the better the flatness of the discharge potential. [The potential of the bulk of crystallite is maintained at a constant level during the discharge due to the decomposition of a graphite intercalation compound which is a discharge product as well as due to the phase separation and, therefore, as the crystallite size in the direction of an a,b-axis is large and the crystallinity of the graphite fluoride is high the length of the flat portion of the discharge curve becomes large.]

5. The lower the crystallinity of $(CF)_n$ or $(C_2F)_n$ the lower the overvoltage. [The reason for this is that lithium ions can be easily moved between the layers of crystals because the crystallite size in the direction of a c-axis becomes small as the crystallinity is low.]

Under the circumstances, it has been desired in the art to provide an electrochemical cell which exhibits not only high discharge potential (or high output voltage) and low overvoltage but also good discharge characteristics with respect to the flatness of discharge potential, discharge capacity and shelf-life.

With respect to the above-mentioned graphite fluoride, it is known that the crystallinity of a raw carbon material influences the crystallinity of a graphite fluoride produced therefrom. Generally, when a crystallite of a carbon material is well developed in the direction of an a,b-axis, the crystallite size of the graphite fluoride crystal in the direction of a c-axis is also large. Therefore, if such raw carbon material is used for producing a graphite fluoride, the resulting graphite fluoride comprises graphite fluoride crystallites which are large in crystallite size not only in the direction of an a,b-axis but also in the direction of a c-axis. As mentioned before, the larger the crystallite size in the direction of an a,b-axis, the better the flatness of discharge potential. On the other hand, the smaller the crystallite size in the direction of a c-axis, the lower the overvoltage. Therefore, it is desired to produce a graphite fluoride comprising crystallites which have a large crystallite size in the direction of an a,b-axis and has a small crystallite size in the direction of a c-axis. However, as mentioned above, a graphite fluoride having a large crystallite size in the direction of an a,b-axis has not a small crystallite size in the direction of a c-axis but a large crystallite size in the direction of a c-axis. Therefore, it has been difficult to produce a graphite fluoride comprising graphite fluoride crystallites which are large in crystallite size in the direction of an a,b-axis and small in crystallite size in the direction of a c-axis. In other words, it has been difficult to produce a graphite fluoride which exhibits not only excellent discharge characteristic with respect to flatness of discharge potential but also low overvoltage and high discharge potential.

Further, there is a problem with respect to the synthesis of a graphite fluoride. For example, $(C_2F)_n$ used as an active material cannot be produced from any other carbon material than a graphite having high crystallinity and a long period of time is needed for the production of $(C_2F)_n$ due to low reaction temperature. Further, a raw carbon material having low crystallinity (e.g., petroleum cokes) can be fluorinated at low temperature to produce $(CF)_n$, but is decomposed to lower fluorocarbons at high temperature. However, it is difficult to control the reaction temperature to prevent the elevation of the reaction temperature. Therefore, $(CF)_n$ cannot be obtained in high yield.

As mentioned above, although an electrochemical cell of the graphite fluoride is generally excellent in discharge characteristics with respect to the flatness of discharge potential etc. as compared with electrochemical cells of manganese dioxide etc., there are problems to be solved.

In order to obtain an active material for an electrochemical cell which is excellent in discharge characteristics, the present inventors have made extensive and intensive studies. As a result, the present inventors have unexpectedly found that when a graphite fluoride produced by fluorinating a decomposition residual carbon which has been obtained by decomposing a covalent graphite intercalation compound in which an intercalant is bonded to a carbon atom by covalent bond is used as an active material of an electrochemical cell, the electrochemical cell exhibits not only high discharge potential and low overvoltage but also excellent discharge characteristics with respect to flatness of discharge voltage, discharge capacity and freedom of leakage as compared with the electrochemical cells of conventional graphite fluorides. The present invention has been made based on such a novel finding.

Accordingly, it is an object of the present invention to provide an electrochemical cell which exhibits high discharge potential and low overvoltage, and excellent discharge characteristics with respect to the flatness of discharge voltage, discharge capacity and shelf-life.

The foregoing and other objects, feautres and advantages of the present invention will be apparent to those skilled in the art from the following detailed description and appended claims taken in connection with the accompanying drawings in which:

Figure 1:
FIG. 1 is a scanning electron microphotograph ($\times 2000$ magnification) of a decomposition residual carbon which is obtained by decomposing $(C_2F)_n$ produced from a natural graphite of Madagascar.

According to the present invention, there is provided an electrochemical cell comprising a negative electrode having as the active material a light metal, an electrolyte, and a positive electrode having as the active material a graphite fluoride produced by fluorinating a decomposition residual carbon which has been obtained by decomposing a covalent graphite intercalation compound in which an intercalant is bonded to the carbon atom by a covalent bond.

A covalent graphite intercalation compound to be used as a raw carbon material will be explained below.

The covalent graphite intercalation compound comprises a carbon atom and an intercalant bonded to the carbon atom by a covalent bond.

As the intercalant bonded to the carbon atom by a covalent bond, there may be mentioned, for example, a fluorine atom, an oxygen atom, etc. As the covalent graphite intercalation compound in which the intercalant is a fluorine atom, there may be mentioned a graphite fluoride. The graphite fluoride includes conventional $(CF)_n$, $(C_2F)_n$ and mixtures thereof. As the covalent graphite intercalation compound in which the intercalant is an oxygen atom, there may be mentioned a graphitic oxide.

The decomposition residual carbon is obtained by heat-decomposing the above-mentioned covalent graphite intercalation compound.

First, the decomposition residual carbon obtained from a graphite fluoride will be explained below. As mentioned before, conventional $(CF)_n$, $(C_2F)_n$ and mixtures thereof may be used as the graphite fluoride for obtaining the decomposition residual carbon. The graphite fluoride may be prepared as follows. The graphite fluoride is obtained by the fluorination of a carbon material, but the composition of a graphite fluoride formed by the fluorination of a carbon material varies depending on the reaction temperature and the kind or crystallinity of the raw carbon material. $(CF)_n$ may be produced by reacting an amorphous carbon material, such as petroleum coke, with fluorine at a temperature of about 200° C. to about 450° C., and $(CF)_n$ or $(CF)_n$-rich mixtures of $(CF)_n$ and $(C_2F)_n$ may be produced by reacting a crystalline carbon material, such as natural and artificial graphites, with fluorine at a temperature of about 500° C. to about 630° C. The reason for conducting the fluorination reaction below 630° C. is that the decomposition of $(CF)_n$ is promoted over 630° C. and that there is not available a material for the reaction vessel which can withstand fluorine corrosion at such high temperatures. Compounds of $(CF)_n$ are produced with varied crystallinities and those having high crystallinities are white solids. On the other hand, $(C_2F)_n$ or $(C_2F)_n$-rich mixtures of $(C_2F)_n$ and $(CF)_n$ may be produced by reacting a crystalline carbon material, such as natural and artificial graphites, with fluorine at a temperature of about 300° C. to about 500° C. The color of $(C_2F)_n$ is black under the conditions for the formation thereof and changes from black through gray to white with heat treatment thereof at elevated temperature of up to about 600° C. with increase of crystallinity. When a natural graphite is used as a raw material, the resulting graphite fluoride product is $(CF)_n$-rich in the event that the fluorination is conducted at a temperature higher than about 500° C., whereas it is $(C_2F)_n$-rich in the event that the fluorination is conducted at a temperature up to about 500° C. The higher the temperature, the more the $(CF)_n$ content of the product, whereas the lower the temperature the more the $(C_2F)_n$ content of the product. The same also applies with respect to an artificial graphite material except that the boundary temperature is not about 500° C. but 470° C.

The reaction time is not critical. If complete fluorination of a carbon material is intended, the fluorination reaction may be continued until weight increase of the graphite fluoride product is no longer recognized. Further, there is an advantageous method in which a carbon material is reacted with fluorine to form a graphite fluoride product which contains a carbon material remaining unreacted, and then, the graphite fluoride product is subjected to sifting with a sieve to recover a graphite fluoride from the carbon material remaining unreacted (see British patent application Laid-Open specification No. 2104883).

As a carbon material, either crystalline or amorphous carbon materials may be used. As the suitable carbon material, there can be mentioned, for example, an artificial graphite, natural graphite, petroleum coke, pitch coke, activated carbon, carbon black and fibrous carbon. The above carbon materials are available on the market. For example, petroleum cokes (amorphous carbon) with varied particle or grain diameters may be produced by expelling volatile components from raw petroleum oil, polymerizing the resulting oil to give raw coke, heating the resulting raw coke in a rotary kiln or Riedhammer calcination furnace at about 1400° C. to obtain calcined coke and grinding the obtained calcined coke to a predetermined size. Further, artificial graphites (crystalline carbon) may be produced by graphitizing the above-obtained coke at about 2400°–3000° C.

In effecting the fluorination of the raw carbon material, fluorine gas produced by electrolysis of a KF-2HF molten salt may either be used as such or used after removing HF which is contained as an impurity. Of course, fluorine gas from a commercially available fluorine gas bomb may also be conveniently utilized. The fluorination reaction may be effected in an atmosphere of either fluorine gas alone or a mixture of fluorine gas and a diluent gas under an $F_2$ partial pressure of 100 to 760 mm Hg. Usually, the fluorination reaction is effected under a pressure of 760 mm Hg. As the suitable diluent gas, there can be mentioned nitrogen gas, argon gas, neon gas, air, perfluoroydrocarbon gas and carbon dioxide gas.

As mentioned hereinbefore, the composition of a graphite fluoride to be formed by the fluorination of a carbon material varies depending on the reaction temperature and the kind or crystallinity of the raw carbon materials.

The thus obtained graphite fluoride is then decomposed to prepare a decomposition residual carbon. Decomposition of a graphite fluoride is effected by heating. That is, the decomposition of a graphite fluoride may be done by heating to a temperature of about 580° to 620° C. in an atmosphere of an inert gas such as argon gas, nitrogen gas and the like or air or under vacuum. The temperature elevation rate is not critical. The temperature at which a graphite fluoride begins to decompose varies depending on the raw carbon material used. However, the decomposition of a graphite fluoride generally begins at the time that the temperature is elevated to about 400° to 500° C. and completes at the time that the temperature reaches the above-mentioned range, i.e. about 580° to 620° C. The decomposition temperatures may be measured by differential thermal analysis. As stated hereinbefore, a decomposition residual carbon from a graphite fluoride may be obtained by preparing and isolating a graphite fluoride and then decomposing the isolated graphite fluoride. The thus obtained decomposition residual carbon is employed for preparing a specific graphite fluoride to be used as an active material in the present invention. Further, there may also be employed a decomposition residual carbon obtained by the thermal decomposition of a conventional graphite fluoride which decomposition accompanies the production of the conventional graphite fluoride. However, since the decomposition residual carbon formed with the production of the conventional graphite fluoride is liable to have randomly distributed particle sizes, the decomposition residual carbon obtained by preparing and isolating a graphite fluoride and then decomposing the isolated graphite fluoride may preferably be employed. The thus obtained decomposition residual carbon contains about 3 to 5% by weight of fluorine, which does not have any adverse effect on the subsequent fluorination step for preparing a graphite fluoride to be used as the active material in the present invention.

Next, explanation will be given with respect to a decomposition residual carbon obtained from a graphitic oxide. A graphitic oxide may be obtained by subjecting a crystalline or amorphous carbon to oxidation treatment according to any conventionally known methods. As such methods, there may be mentioned, for example, those proposed by W. S. Hummers et al [W. S. Hummers et al, J. Amer. Chem. Soc., p. 1339 (1958)], S. Okada et al [Zairyo Shiken (Test of Materials) vol. 2, No. 8, p. 363–366 (1953)], O. W. Storey [O. W. Storey, Trans. Amer. Electrochem. Soc., vol. 53, p. 119–127 (1928)], and B. K. brown et al [B. K. Brown et al, Trans. Amer. Electrochem. Soc., vol. 53, p. 129–147 (1928)]. In general, a graphitic oxide may be prepared by heating a mixture comprising as a carbon material a crystalline or amorphous carbon, a strong acid type oxidant and water at a temperature not exceeding 120° C., preferably at about 100° C. As mentioned above, both crystalline and amorphous carbon may be used as the carbon material. As the suitable carbon materials, there may be mentioned, for example, an artificial graphite, natural graphite, petroleum coke, activated carbon, carbon black and fibrous carbon. The size of a carbon material is not critical. Preferably, there may be employed a wide range of particle sizes of carbon materials, that is, from a particulate carbon material having a particle size of about 10 μm to a flaky carbon material having a size of about several mm. As a strong acid type oxidant, any strong acid type oxidant used for ordinary oxidation treatment may be employed without any special restrictions. For example, a mixture of a salt such as potassium permanganate, potassium chlorate and potassium dichromate and a strong acid such as a fuming sulfuric acid and a fuming nitric acid may be used as the strong acid type oxidant. The reaction time for preparing a graphitic oxide is not critical. Since the color of the reaction mixture changes from black to brown with the formation of a graphitic oxide, the formation of a graphitic oxide may be recognized by observing the color of the reaction mixture. Generally, the reaction for preparing a graphitic oxide completes after 2 to 20 minutes from the initiation of the reaction. The amount ratio of a carbon material, a strong acid type oxidant and water is not critical. However, if the proportion of water is too high, it is possible for a graphitic oxide not to be formed in good yield. An appropriate ratio may be decided according to the results of preliminary tests in which the oxidation reactions for producing a graphitic oxide are performed with varied ratios of the raw materials and the yields are judged by observing the color of the reaction mixture. The reaction mixture comprising a carbon material, a strong acid type oxidant and water may be prepared by mixing the carbon material, the strong acid type oxidant and water at once, or by adding water to a mixture which has been prepared in advance by immersing the carbon material in the strong acid type oxidant. For example, according to the method proposed by Hummers et al as mentioned above, the reaction mixture is obtained by first immersing a carbon material in a strong acid type oxidant comprising a fuming sulfuric acid, sodium nitrate and potassium permanganate and then adding water thereto. For example, a carbon material and sodium nitrate are mixed and a fuming sulfuric acid is then added thereto. Next, potassium permanganate is added to the mixture while cooling. After the mixture is allowed to stand at about 25 to 45° C. for about 10 minutes to about 30 hours, water is added to the resultant mixture to elevate the temperature of the mixture by the action of a hydration heat of the water and acid to about 70° to 120° C., thereby forming a graphitic oxide.

The thus formed graphitic oxide is taken out of the reaction mixture by, for example, filtration or the like and then washed with an alcohol such as methanol and ethanol. The obtained graphitic oxide assumes a black or blackish brown color. A graphitic oxide may also be prepared by customary electrolytic oxidation technique.

The thus obtained graphitic oxide is then decomposed to obtain a decomposition residual carbon. Decomposition of a graphitic oxide is effected by heating. That is, the decomposition of a graphitic oxide may be done by elevating the temperature to about 200° to 400° C. at a temperature elevation rate of about 1.0° C./min or less, preferably 0.2° C./min or less in an atmosphere of an inert gas such as an argon gas and a nitrogen gas or in an atmosphere of air, and subsequently in vacuo at about 400° to 500° C. for about 1 to 3 hours. If the temperature elevation rate is 1.0° C./min or higher, it is dangerous because the graphitic oxide decomposes explosively. Alternatively, a decomposition residual carbon may be obtained by subjecting a crystalline or amorphous carbon to treatment with an oxidizing medium comprising a strong acid type oxidant and water to obtain an oxidation reaction mixture containing a graphitic oxide, and heating the oxidation reaction mixture up to from 120° C. to 230° C. so that the graphitic oxide in the oxidation reaction mixture is decomposed to form a decomposition residual carbon, followed by separation of the decomposition residual carbon. In order to heat the oxidation reaction mixture containing a graphitic oxide to 120° C. to about 230° C. there may be employed, for example, a method in which the oxidation reaction mixture is heated as such, and a method in which water is additionally added to the oxidation reaction mixture to elevate the temperature of the reaction mixture by hydration heat produced by the hydration of the added water and the acid in the mixture. The latter method is advantageous that a decomposition residual carbon can be produced more speedily than by the former method. In the latter method in which water is additionally added to the reaction mixture to generate hydration heat, the amount of water to be further added is not critical. The heating of the oxidation reaction mixture may be effected by the hydration heat only. The heating of the oxidation reaction mixture may also be partially performed by hydration heat produced by adding water to the oxidation reaction mixture. For example, when water is gradually added to the oxidation reaction mixture to avoid a rapid reaction between the added water and the acid in the oxidation reaction mixture, the hydration heat generated may be insufficient for elevating the temperature of the oxidation reaction mixture up to from 120 to about 230° C. In such a case, the other auxiliary heat source may be used at the same time. The temperature elevation rate for heating the oxidation reaction mixture is not critical. The reaction time after the temperature of the oxidation reaction mixture has reached a desired level is also not critical and depends on the temperature elevation rate.

In general, a decomposition residual carbon may be obtained by maintaining the elevated temperature for about 2 minutes or more. However, it may be possible to obtain a decomposition residual carbon within 2 minutes at the elevated temperature if the temperature of the reaction mixture has been elevated at a relatively low temperature elevation rate. The above-mentioned method in which a decomposition residual carbon is obtained by heating the oxidation reaction mixture containing a graphitic oxide without isolating the graphitic oxide from the oxidation reaction mixture is advantageous because there is no danger that the graphitic oxide decomposes explosively since the decomposition of the graphitic oxide is effected in a liquid medium, and because the step for isolating the formed graphitic oxide from the oxidation reaction mixture can be omitted. Then, water is added to the obtained reaction mixture containing the formed decomposition residual carbon to cool the mixture, and the decomposition residual carbon is separated from the mixture, and then, washed with water and dried. The drying conditions are not critical. For example, the drying may be effected at about 100° to 400° C. for several hours in vacuo. The thus obtained decomposition residual carbon from a graphitic oxide contains about 5 to 25% by weight of oxygen, which does not have any adverse effect on the subsequent fluorination process for producing a graphite fluoride to be used as an active material in the present invention.

The decomposition residual carbon obtained by decomposing a covalent graphite intercalation compound such as a graphite fluoride, graphitic oxide or the like assumes a black color and has a specific structure. That is, the crystallite size of the decomposition residual carbon crystal in the c-direction is extremely small as compared with those of a natural graphite, artificial graphite and the like, and there is a great disorder in, for example, stacking of the crystallite layers of the decomposition residual carbon. The crystallite size in the a,b-direction is as large as several times to several ten times that in the c-direction.

The specific structure of the decomposition residual carbon may be recognized from a scanning electron micrograph or from data on the lattice constants and crystallite size. In FIG. 1 is shown an scanning electron microphotograph (2000-magnification) of a decomposition residual carbon prepared by heating $(C_2F)_n$ (F/C ratio: 0.65), which is obtained by fluorination of a natural graphite from Madagascar at 350° C. for 21 days, to 600° C. at a temperature elevation rate of about 5° C./min in an atmosphere of an argon gas. In Table 1 is given data on the lattice constants and the crystallite size of the above-mentioned decomposition residual carbon obtained from the above $(C_2F)_n$ in comparison with those of a natural graphite from Madagascar, a petroleum coke which has been heat-treated at 2800° C., a petroleum coke which has not been heat-treated, an expanded graphite prepared from an intercalation compound of a graphite with $HNO_3$ (in which the intercalant is bonded to the carbon by an ionic bond) and an expanded graphite prepared from a ternary intercalation compound of a graphite with $MgF_2$ and $F_2$ (in which the intercalants are bonded to the carbon by an ionic bond). The measurement was effected according to the method of measuring the lattice constants and crystallite size of carbon materials established by the 117th Committee of the Japan Society for the Promotion of Science.

TABLE 1

| Carbon material | $c_0(002)$ (Å) | $L_c(002)$ (Å) | $a_0(110)$ (Å) | $L_a(110)$ (Å) |
|---|---|---|---|---|
| Natural graphite from Madagascar | 6.708 | >1000 | 2.461 | >1000 |
| 2800° C.-treated petroleum coke | 6.720 | >1000 | 2.461 | >1000 |
| Heat-untreated petroleum coke | 6.900 | 36 | — | 28 |
| Expanded graphite from $HNO_3$-graphite intercalation compound | 6.71 | 500–1000 | — | — |
| Expanded graphite from $MgF_2$, $F_2$-graphite intercalation compound | 6.71 | ≈200 | — | — |
| Decomposition residual carbon from $(C_2F)_n$ | 7.751 | 46 | 2.456 | 280 |

Note:
$c_0(002)$ represents the lattice constant of a graphite in the direction of c-axis;
$L_c(002)$ represents the crystallite size in the direction of a c-axis;
$a_0(110)$ represents the lattice constant in the direction of an a,b-axis; and
$L_a(110)$ represents the crystallite size in the direction of an a,b-axis.

The obtained decomposition residual carbon is fluorinated to prepare a novel graphite fluoride to be used as the active material for an electrochemical cell of the present invention. An explanation will be given below with respect to the fluorination of a decomposition residual carbon. The following will be mentioned only as examples, and they should not be construed to be limiting method for preparing the specific graphite fluoride to be used for an electrochemical cell of the present invention. For instance, the graphite fluoride may also be prepared by electrolytic fluolination.

In general, the fluorination of the decomposition residual carbon may be performed in a fluorine stream at a temperature of from about 20° to 550° C. In the case of the decomposition residual carbon obtained from a graphite fluoride, the fluorination temperature is generally in the range of from 350° to 550° C., preferably 380° to 520° C., more preferably 400° to 500° C. In the case of the decomposition residual carbon obtained from a graphitic oxide, the fluorination temperature varies depending on the kind of the carbon material which has been used for preparing the graphitic oxide. In the case where the graphitic oxide has been prepared from a natural graphite, the fluorination temperature for the decomposition residual carbon generally is in the range of 300° to 500° C. preferably 350° to 450° C. which is relatively high as compared with that in the case where the graphitic oxide has been prepared from a petroleum coke. In the case where the graphitic oxide has been prepared from a petroleum coke, the fluorination temperature is in the range of from 20° to 550° C., preferably 100° to 450° C., more preferably 150° to 400° C. If the fluorination temperature is higher than 550° C., disordered portions of the crystallites will be decomposed and only portions having a high crystallinity will remain undecomposed, thereby to disadvantageously form a graphite fluoride which is not different from conventional $(CF)_n$. The flow rate of the fluorine stream is not critical and varies depending on the amount of the decomposition residual carbon. For example, several to several hundred gram of a decomposition residual carbon may be fluorinated at a flow rate of the fluorine stream of 10 to 50 ml/min. Usually the fluorination reaction is effected under a fluorine pressure of 100 to 760 mmHg. The fluorination reaction of the decomposed residual carbon is terminated at the time that heat generation by the fluorination reaction of the carbon becomes not recognized, which time may be determined, for example, by tracing the temperature change in the reaction vessel. The reaction time for the fluorination varies depending on the amount of the decomposition residual carbon and on the flow rate of the fluorine stream, but is generally from several ten minutes to about 6 hours. When the fluorination reaction is effected at a temperature as high as about 500° to 550° C., since the fluorination reaction is accompanied by an exothermic decomposition reaction to a small extent, the generation of heat by the fluorination reaction and that by the decomposition reaction occur at the same time. In this case, when the temperature of the reaction system becomes constant, the fluorination reaction is terminated. Further, in the case of effecting the fluorination reaction at about 500° to 550° C., if the fluorination reaction is effected for an excess period of time, that is, if the fluorination reaction is further effected after the time that the temperature of the reaction system becomes constant, disordered portions of crystallites will be decomposed, thereby to disadvantageously form a graphite fluoride which is not different from conventional $(CF)_n$.

The above is an explanation of preparation methods for a novel class of graphite fluoride to be used for the electrochemical cell of the present invention, in which the graphite fluoride may be prepared by fluorinating a decomposition residual carbon obtained from a covalent graphite intercalation compound, such as a graphite fluoride and a graphitic oxide. Of the covalent intercalation compounds, a graphitic oxide is advantageously employed because it is not necessary to use expensive fluorine gas for the preparation thereof. Further, in the case of a graphitic oxide, the method in which the preparation and decomposition of the graphitic oxide is performed in a single vessel is advantageously employed because the procedures can be continuously and easily effected. Further, it should be noted that, as is apparent from Examples as will be given hereinafter, an electrochemical cell in which the graphite fluoride produced from a graphitic oxide by such a method is used as the active material has markedly excellent discharge characteristics.

Figure 3:
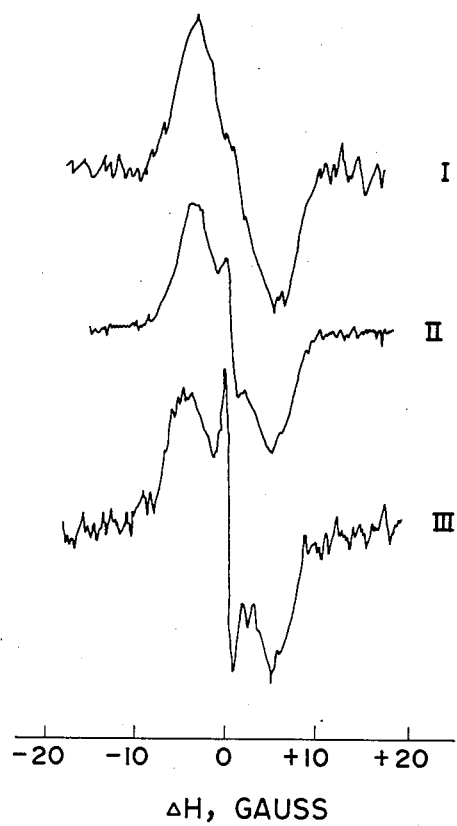
FIG. 3 is a graph showing the results of $^{19}$F-NMR analysis with respect to conventional $(CF)_n$ and $(C_2F)_n$ and a specific graphite fluoride to be used in the present invention which specific graphite fluoride is obtained by fluorinating a decomposition residual carbon produced from $(C_2F)_n$.

The thus obtained novel class of graphite fluoride has an F/C ratio of 0.8 to 1.2 with respect to those obtained by fluorination at high temperatures, for example, 450° to 550° C. The graphite fluoride to be used in the present invention assumes a color of black to blackish brown or gray, which color is different from the color of the conventional $(CF)_n$. The reason why the present novel graphite fluoride assumes such a color of black to blackish brown or gray is considered to be that aromatic condensed carbocycles (hereinafter often referred to as "defects") are present therein. According to the $^{19}$F-NMR analysis, there can be found the presence of free fluorine (hereinafter referred to simply as "adsorbed fluorine") adsorbed by the defects in the novel graphite fluoride, whereas, in the case of the conventional $(CF)_n$ and $(C_2F)_n$, the presence of such an adsorbed fluorine is not observed. In FIG. 3, results of the $^{19}$F-NMR analysis of the novel specific graphite fluoride to be used for the present electrochemical cell are shown in comparison with those of conventional $(CF)_n$ and $(C_2F)_n$. The novel specific graphite fluoride as shown in FIG. 3 was prepared by a method which comprises fluorinating a natural graphite from Madagascar at 350° C. for 21 days to obtain $(C_2F)_n$, heating to 600° C. to decompose the obtained $(C_2F)_n$ to obtain a decomposition residual carbon, and fluorinating the obtained decomposition residual carbon at 450° C. for 30 minutes. The conventional $(CF)_n$ as shown in FIG. 3 was prepared by directly fluorinating a natural graphite from Madagascar at 350° C., and the conventional $(C_2F)_n$ as shown in FIG. 3 was also prepared by directly fluorinating a natural graphite from Madagascar at 350° C. As is apparent from FIG. 3, the spectrum of the specific graphite fluoride to be used in the present invention indicates a sharp and narrow peak derived from the adsorbed fluorine as opposed to those in the conventional $(CF)_n$ and $(C_2F)_n$.

As is apparent from the foregoing, the graphite fluoride to be used as the active material for the present electrochemical cell is a novel one and utterly different from the conventional $(CF)_n$ and $(C_2F)_n$ prepared by directly fluorinating an ordinary crystalline or amorphous carbon material as described in, for example, U.S. Pat. No. 4,247,608 specification. It is particularly surprising that, as mentioned hereinbefore, an electrochemical cell containing as the active material the novel specific graphite fluoride which is different from the conventional $(CF)_n$ and $(C_2F)_n$ is extremely excellent with respect to the necessary characteristics for an electrochemical cell. That is, the electrochemical cell of the present invention has a high discharge potential, an excellent potential flatness and a high discharge capacity.

An explanation will be given hereinbelow with respect to the construction of an electrochemical cell by using as an active material the novel specific graphite fluoride obtained by the fluorination of the decomposed residual carbon as mentioned above. For example, a graphite fluoride to be used in the present invention is mixed with an electrically conductive material such as a carbon black and acetylene black and a binder such as a polyethylene, a fluoropolymer, e.g., polytetrafluoroethylene, and an expanded graphite to prepare an active material mixture. The mixture can be easily molded into a predetermined shape to form a positive electrode. In preparing a positive electrode, a ternary intercalation compound of a graphite developed by Watanabe et al. consisting of a graphite, a metal fluoride and fluorine and represented by a formula $C_xF(MF_z)_y$ (wherein M is a metal selected from a group consisting of an alkali metal, an alkaline earth metal, a transition metal, a metal belonging to group III A in the periodic table and lead, x is about 1 to about 100, y is about 0.0001 to about 0.15 and z is valence of M) (described in Japanese patent application Laid-Open Specifications Nos. 58-60607, 58-60608, 59-50011 and 59-164603) may be advantageously used as an electrically conductive material to import to the positive electrode a superior electric conductivity and at the same time to improve the discharge characteristics of the cell due to the fluorine value contained in the compound. The amount of a carbon black or an acetylene black as the electrically conductive material is not critical and may be up to about 100 wt %, preferably 3 to 20 wt %, more preferably 8 to 15 wt % based on the above-mentioned active material mixture. The amount of the binder is also not critical and may be up to about 100 wt %, preferably 1 to 10 wt % based on the active material mixture. An expanded graphite can advantageously serve not only as a binder but also as an electrically conductive material, and the amount of an expanded graphite to be used is not critical and may be up to about 100 wt %, preferably 25 to 75 wt % based on the active material mixture. Thus, the positive electrode is produced simply by molding the mixture, preferably about a metallic reinforcing member comprising a central screen of nickel. The reinforcing member may alternatively be any metal screen or grid, a perforated plate or lath plate or fibrous carbon.

The negative electrode to be used in combination with the above-mentioned positive electrode may be made of a light metal or light metal alloy, examples of which include alkali metals such as lithium and sodium; alkaline earth metals such as magnesium and calcium; aluminum; and alloys containing as the main component any of the above-mentioned metals.

The electrolyte to be used in the electrochemical cell of the present invention depends on the kind of negative electrode metal and is usually of non-aqueous system. The concentration of the electrolyte is not critical and may be chosen so that it gives a high electrical conductivity. As the solute of the electrolyte, there may be used various compounds, for example, $LiBF_4$, $LiClO_4$, $KPF_6$, $LiAlCl_4$ and the like. As the non-aqueous solvent of the electrolyte, there may be used various compounds, for example, propylene carbonate, ethylene carbonate, dimethylformamide, tetrahydrofuran, dimethyl sulfoxide, dimethyl sulfite, 1,2-dimethoxyethane, methyl formate, acetonitrile and the like.

As mentioned before, the conventional graphite fluoride type electrochemical cells have some advantageous characteristics but, at the same time, have serious disadvantages as well. Specifically, an electrochemical cell using $(CF)_n$ as the active material is excellent in flatness of discharge potential but poor in discharge potential, while an electrochemical cell using $(C_2F)_n$ as the active material is excellent in discharge potential but poor in flatness of discharge potential. On the other hand, the electrochemical cell using a novel specific graphite fluoride as the active material of the positive electrode according to the present invention is surprisingly excellent in all characteristics in respect of discharge potential, flatness of discharge potential, discharge capacity and shelf life, with great advantages. Therefore, the electrochemical cell of the present invention can be advantageously used for various devices using an electrochemical cell.

The present invention will now be described in more detail with reference to the following Examples that should not be construed as limiting the scope of the invention.

EXAMPLE 1

Figure 2:
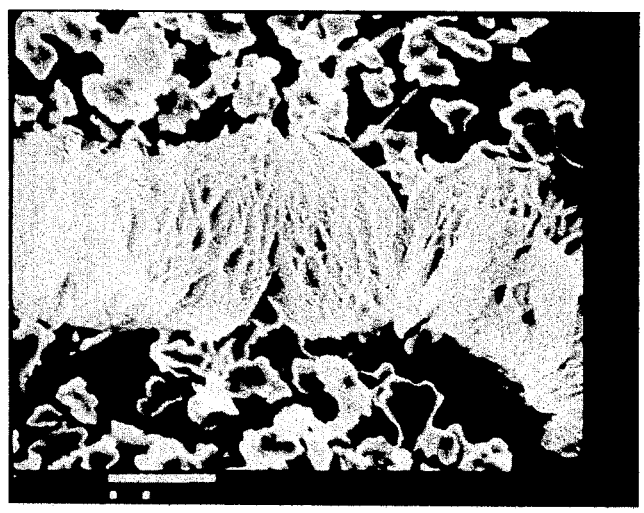
FIG. 2 is a scanning electron microphotograph ($\times 2000$ magnification) of a graphite fluoride which is obtained by fluorinating a decomposition residual carbon obtained by decomposing $(C_2F)_n$ produced from a natural graphite of Madagascar.

A natural graphite (200 to 250 mesh, Tyler) from Madagascar was reacted with fluorine at 350° C. for 21 days to obtain $(C_2F)_n$. The thus obtained $(C_2F)_n$ was subjected to elementary analysis. As a result, the F/C ratio of the $(C_2F)_n$ was found to be 0.65. The thus obtained $(C_2F)_n$ was heated at a temperature elevation rate of 5° C./min. While heating, the thermal decomposition of the $(C_2F)_n$ was monitored by differential thermal analysis. The thermal decomposition of the $(C_2F)_n$ was started at 480° C. and completed at 600° C. The temperature at the peak of thermal decomposition of the $(C_2F)_n$ was 574° C. After completion of the decomposition, the temperature was lowered to obtain a decomposition residual carbon. The decomposition residual carbon was subjected to elementary analysis. As a result, it was found that the decomposition residual carbon contained 4% by weight of fluorine. The decomposition residual carbon was observed under a scanning electron microscope. A scanning electron microphotograph of the decomposition residual carbon (×2000 magnification) is shown in FIG. 1. Then, the decomposition residual carbon was fluorinated in an atmosphere of fluorine at 450° C. for 30 min to obtain a graphite fluoride. The thus obtained graphite fluoride was observed under a scanning electron microscope. A scanning electron microphotograph of the graphite fluoride (×2000 magnification) was shown in FIG. 2. The graphite fluoride was subjected to elementary analysis. As a result, the F/C ratio of the graphite fluoride was found to be 0.99.

The graphite fluoride was mixed with acetylene black and a polyethylene in a weight ratio of 1:1:1, and the mixture was compression-molded under a pressure of about 4,600 Kg/cm² for 1 min to obtain a pellet of 9 mm in diameter and 1 mm in thickness.

Propylene carbonate (hereinafter often referred to as "PC") to be used for the preparation of an electrolytic solution was prepared by subjecting a commercially available PC to dehydration and purification by vacuum distillation at a temperature below 100° C. under a pressure of 10 mmHg, and stored in a desiccator where the propylene carbonate was dried on a 4 A molecular sieve (a sieve having sieve size of 4 Å and manufactured by E. I. Du Pont, U.S.A.) so that the moisture content of the PC was 100 ppm or less. Lithium perchlorate ($LiClO_4$) to be used as the solute of an electrolytic solution was prepared by a method in which a commercially available $LiClO_4$ was kept over phosphorus pentoxide and vacuum-dried for about one week. A solution of 1 M lithium perchlorate ($LiClO_4$) in one liter of propylene carbonate (PC) was prepared, and placed in a desiccator where the solution was dried on a 4A molecular sieve and stored in a dry box.

Around the pellet obtained before was wound Carboron (trade name of carbon fiber manufactured by Nihon Carbon K. K., Japan) in a thickness of about 1 mm. The terminal portion of carbon fiber was inserted through a polyethylene tube to give an electrical connection to obtain a graphite fluoride electrode element. The above-prepared graphite fluoride electrode element was coated with polyethylene using an electric iron, leaving one-side surface thereof exposed, thereby to provide a graphite fluoride positive electrode. Lithium pellets cut off from a lithium block were used as the negative electrode and the reference electrode. The cell body was made of Polyflon (trade mark of a polyfluoroethylene type resin manufactured and sold by Daikin Kogyo K. K., Japan). The negative electrode and the positive electrode were disposed at a distance of 10 mm therebetween. The graphite fluoride positive electrode was securely inserted in a first concaved portion on the inner wall of the cell body to hold the same therein. The lithium negative electrode (10 mm×35 mm) was given electrical connection by means of a nickel net and securely inserted in a second concaved portion formed opposite to the first concaved portion to hold the same therein. The lithium reference electrode was given electrical connection by means of a platinum wire. The respective lead fiber and wire were insulated with polyethylene as mentioned above.

The discharge of the thus obtained electrochemical cell was carried out at a current density of 0.5 mA/cm² in an atmosphere of argon at 25° C. to measure a closed circuit voltage (hereinafter often referred to as "CCV"), an OCV at the time when the 25% of the total discharge capacity was discharged, an overvoltage and a discharge capacity. The results are shown in Table 2.

Figure 4:
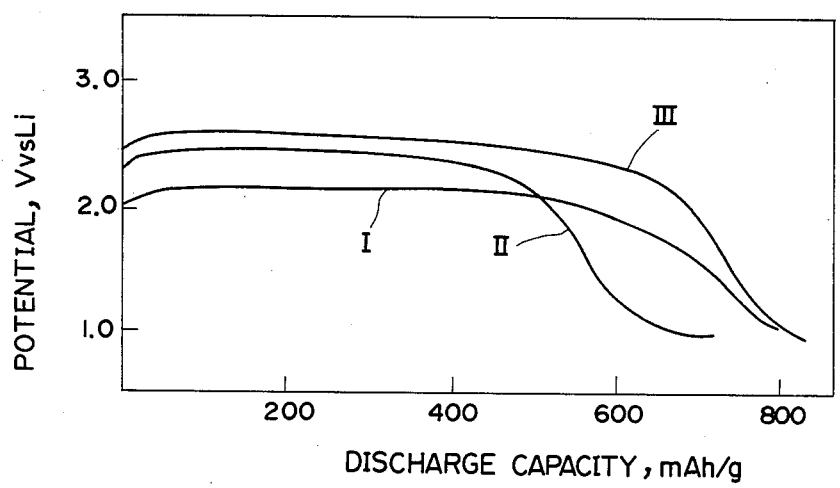
FIG. 4 is a graph showing the relationships between the discharge capacity and the potential, with respect to conventional $(CF)_n$ and $(C_2F)_n$ and a specific graphite fluoride to be used in the present invention.

Further, the relationship between the discharge capacity (mAh/g) and the potential (V vs Li) is illustrated as a curve III in FIG. 4.

COMPARATIVE EXAMPLE 1

An electrochemical cell was prepared in substantially the same manner as described in Example 1 except that a conventional graphite fluoride $(CF)_n$ which had been obtained by reacting a natural graphite (200 to 250 mesh, Tyler) from Madagascar with fluorine at 600° C. was used as the active material. Then, the discharge characteristics of the obtained electrochemical cell were measured in substantially the same manner as described in Example 1. The results are shown in Table 2. Further, the relationship between the discharge capacity (mAh/g) and the potential (V vs Li) is illustrated as a curve I in FIG. 4.

COMPARATIVE EXAMPLE 2

An electrochemical cell was prepared in substantially the same manner as described in Example 1 except that a conventional graphite fluoride $(C_2F)_n$ which had been obtained by reacting a natural graphite (200 to 250 mesh, Tyler) from Madagascar with fluorine at 350° C. was used as the active material. Then, the discharge characteristics of the obtained electrochemical cell were measured in the same manner as described in Example 1. The results are shown in Table 2. Further, the relationship between the discharge capacity (mAh/g) and the potential (V vs Li) is illustrated as a curve II in FIG. 4.

TABLE 2

| | Open Circuit Voltage (V vs Li) | Closed Circuit Voltage (V vs Li) | Overvoltage (V) | Discharge Capacity (mAh/g) | Energy Density (VAh/kg) | Utility (%) |
|---|---|---|---|---|---|---|
| Example 1 | 3.49 | 2.55 | 0.94 | 740 | 1700 | 86 |
| Comparative Example 1 | 3.28 | 2.09 | 1.19 | 720 | 1500 | 84 |
| Comparative Example 2 | 3.26 | 2.35 | 0.91 | 560 | 1400 | 80 |

Note:
The discharge capacity was measured when the closed circuit voltage was lowered to 1.5 V.

EXAMPLES 2 to 5

Figure 5:
FIG. 5 is a scanning electron microphotograph ($\times 2000$ magnification) of a decomposition residual carbon obtained by decomposing a graphitic oxide.
Figure 6:
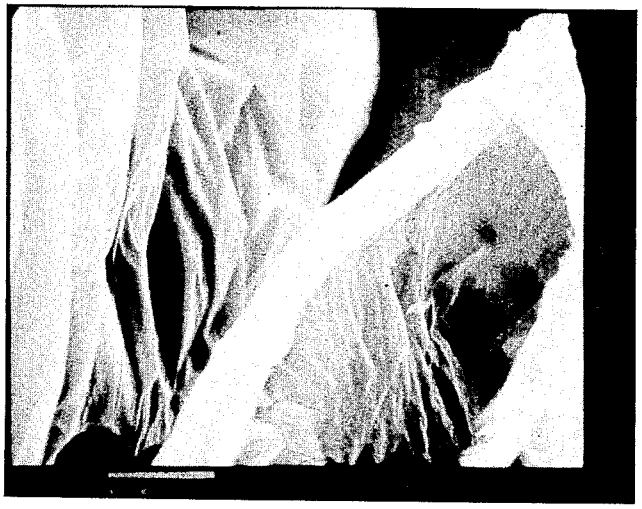
FIG. 6 is a scanning electron microphotograph ($\times 2000$ magnification) of a dried decomposition residual carbon obtained by decomposing a graphitic oxide.
Figure 7:
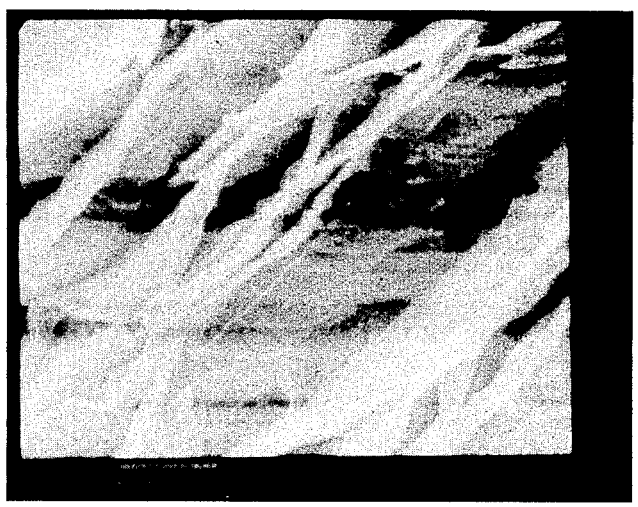
FIG. 7 is a scanning electron microphotograph ($\times 2000$ magnification) of a graphite fluoride which is obtained by fluorinating, at 500° C., a decomposition residual carbon obtained by decomposing a graphitic oxide.
Figure 8:
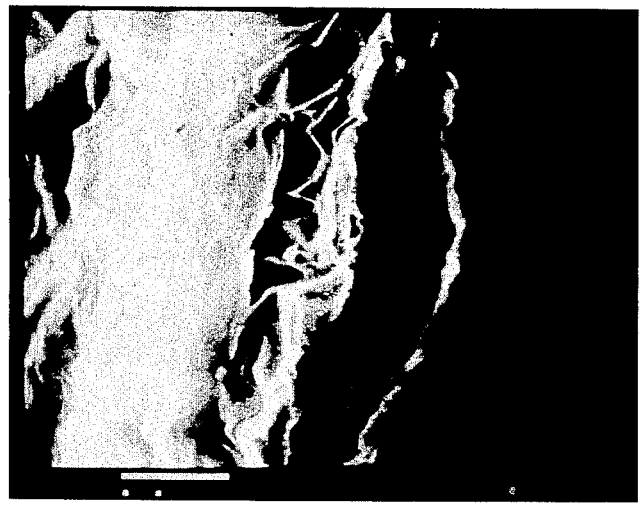
FIG. 8 is a scanning electron microphotograph ($\times 2000$ magnification) of a graphite fluoride which is obtained by fluorinating, at 400° C., a decomposition residual carbon obtained by decomposing a graphitic oxide.
Figure 9:
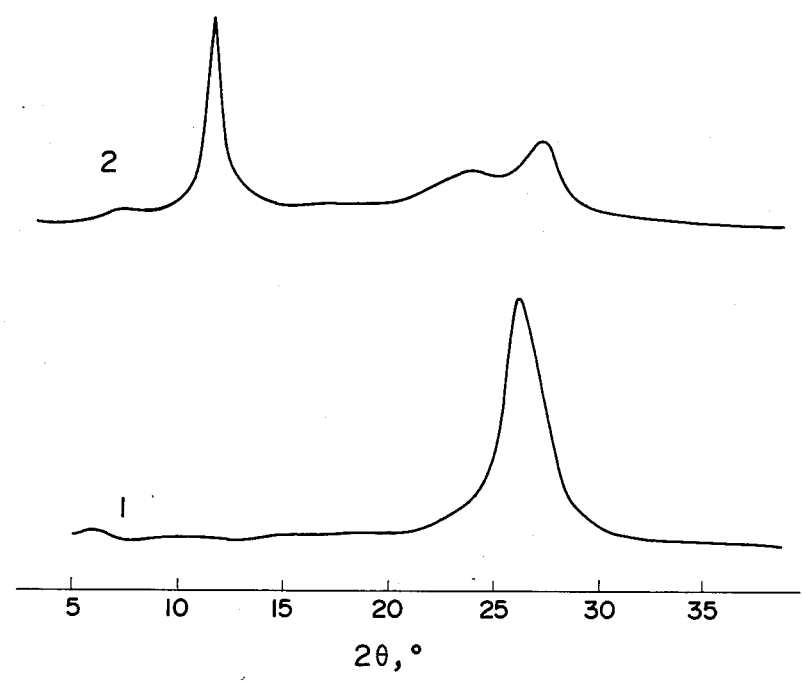
FIG. 9 shows the powder X-ray diffraction patterns of a graphitic oxide and a decomposition residual carbon which is obtained by decomposing a graphitic oxide in a oxidation reaction mixture by heat treatment.
Figure 10:
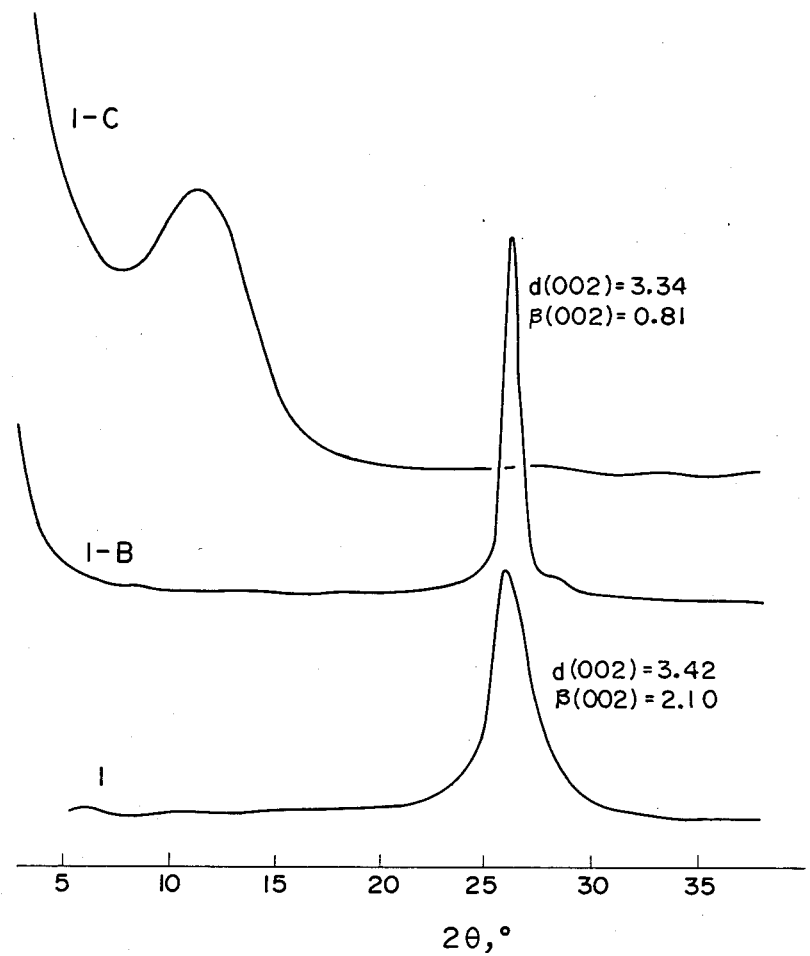
FIG. 10 shows the powder X-ray diffraction patterns of a decomposition residual carbon obtained by decomposing a graphitic oxide in a graphite oxidation reaction mixture, a dried decomposition residual carbon obtained by drying the above-mentioned decomposition residual carbon at 400° C. for 2 hours in vacuo, and a graphite fluoride obtained by fluorinating the dried decomposition residual carbon.
Figure 12:
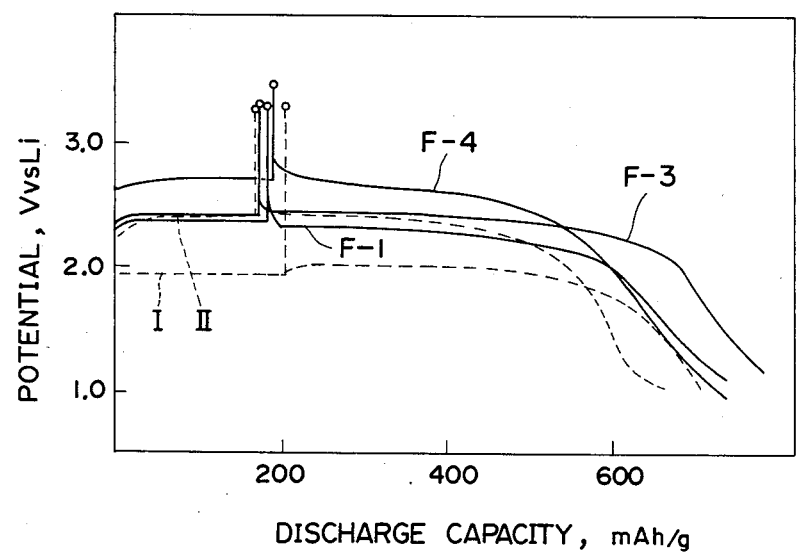
FIGS. 12 and 13 are graphs showing the relationships between the discharge capacity and the potential with respect to graphite fluorides which are obtained by fluorinating a decomposition residual carbon obtained from a graphitic oxide, and of conventional $(CF)_n$ and $(C_2F)_n$.
Figure 13:
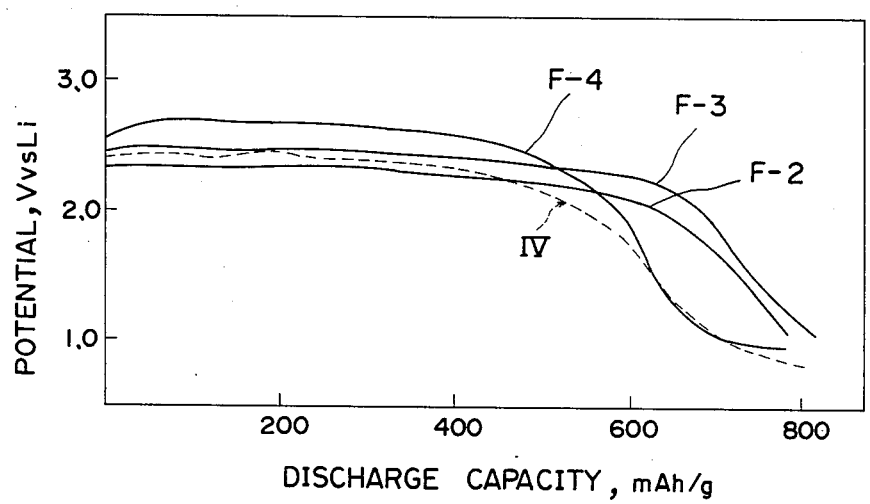

10 g of a natural graphite (20 to 50 mesh, Tyler) was mixed with 5 g of sodium nitrate and the resulting mixture was put in a flask. To the mixture was added 230 ml of nitric acid, and then, was gradually added 30 g of potassium permanganate while stirring and cooling. Subsequently, the mixture was allowed to stand at 35° C. for 20 minutes, and then, water was added to the mixture to raise the temperature of the mixture up to 180° C. by hydration heat. An oxidation reaction was effected at that temperature for 30 minutes. After completion of the reaction, water was further added to the mixture to lower the temperature of the mixture, thereby to obtain a decomposition residual carbon. The thus obtained decomposition residual carbon was washed and subjected to X-ray diffractometry. The thus obtained powder X-ray diffraction pattern is illustrated as a curve 1 in FIG. 9 and a curve 1 in FIG. 10. The decomposition residual carbon was observed under a scanning electron microscope. A scanning electron microphotograph of the decomposition residual carbon (×2000 magnification) is shown in FIG. 5. Then, the decomposition residual carbon was vacuum dried at 400° C. for 2 hours. A scanning electron microphotograph of the dried decomposition residual carbon (×2000 magnification) is shown in FIG. 6. The dried decomposition residual carbon was also subjected to X-ray diffractometry. The thus obtained powder X-ray diffraction pattern is illustrated as a curve 1-B in FIG. 10. Then, the dried decomposition residual carbon was fluorinated under the reaction conditions as given in Table 3. The thus obtained graphite fluorides were subjected to X-ray diffractometry. One of the obtained powder X-ray diffraction pattern is illustrated as a curve 1-C in FIG. 10. Further, the graphite fluorides obtained by the fluorination at 500° C. (F-1) and 400° C. (F-3) were observed under a scanning electron microscope. Scanning electron microphotographs of graphite fluorides F-1 and F-3 (×2000 magnification) are shown in FIG. 7 and FIG. 8, respectively. Electrochemical cells were prepared in substantially the same manner as described in Example 1 except that the above obtained graphite fluorides were used as the active material. The discharge characteristics of the obtained electrochemical cells were measured in substantially the same manner as described in Example 1. The results of the measurement are shown in Table 3. Further, the relationships between the discharge capacity (mAh/g) and the potential (V vs Li) are illustrated in FIGS. 12 and 13. The curves I and II in FIG. 12 respectively show the discharge characteristics of $(CF)_n$ obtained in Comparative Example 1 and $(C_2F)_n$ obtained in Comparative Example 2.

COMPARATIVE EXAMPLE 3

Figure 14:
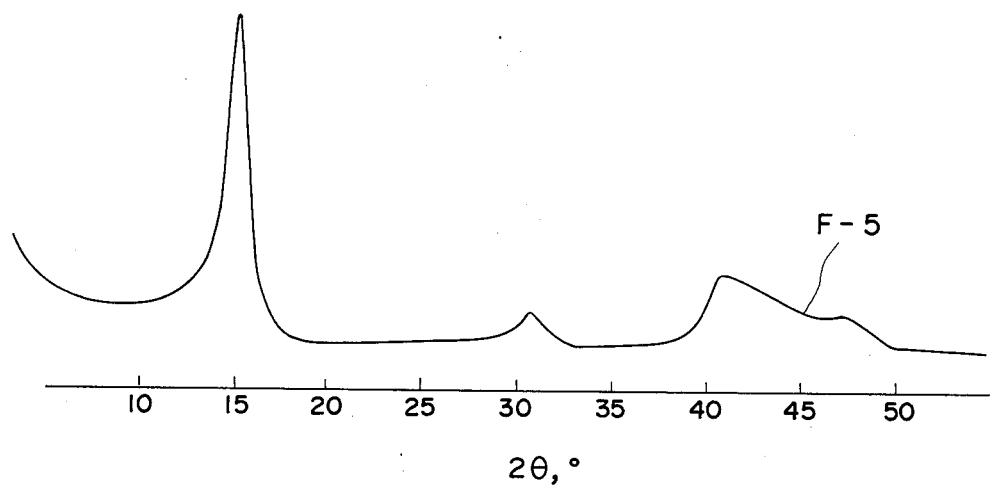
FIG. 14 shows the powder X-ray diffraction pattern of a graphite fluoride which is obtained by fluorinating, at 600° C., a decomposition residual carbon obtained from a graphitic oxide.
Figure 15:
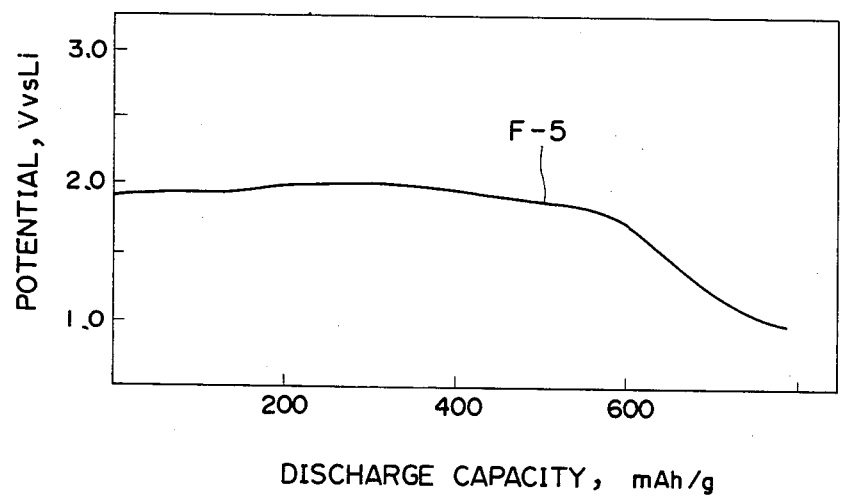
FIG. 15 is a graph showing the relationships between the discharge capacity and the potential with respect to a graphite fluoride which is obtained by fluorinating, at 600° C., a decomposition residual carbon obtained from a graphitic oxide.

A graphite fluoride was obtained in substantially the same manner as described in Example 2 except that a decomposition residual carbon was fluorinated at 600° C. for 4 hours. The thus obtained graphite fluoride was subjected to X-ray diffractometry. The obtained X-ray diffraction powder pattern is illustrated as a curve F-5 in FIG. 14. The powder X-ray diffraction pattern is substantially the same as that of a conventional $(CF)_n$ which will be described later. An electrochemical cell was prepared in substantially the same manner as described in Example 1 except that the above obtained graphite fluoride was used as the active material. The discharge characteristics of the thus obtained electrochemical cell were measured in substantially the same manner as described in Example 1. The results of the measurement are shown in Table 3. Further, the relationship between the discharge capacity and the potential is shown in FIG. 15.

TABLE 3

| | No. | Reaction Temperature, Time | F/C | X-ray Diffractometry β(002) | d(002) | OCV (V) | CCV (V) | Discharge Capacity (mAh/g) | Overvoltage (V) | Energy Density (VAh/kg) | Utility (%) |
|---|---|---|---|---|---|---|---|---|---|---|---|
| Example 2 | F-1 | 500° C. 6 hr | 0.96 | 3.20 | 6.26 | 3.32 | 2.35 | 839 | 0.97 | 1690 | 100 |
| Example 3 | F-2 | 450° C. 4 hr | 0.94 | 3.95 | 6.52 | 3.36 | 2.40 | 850 | 0.96 | 1770 | 100 |
| Example 4 | F-3 | 400° C. 6 hr | 0.86 | 4.5 | 7.6 | 3.38 | 2.47 | 850 | 0.91 | 1870 | 105 |
| Example 5 | F-4 | 350° C. 4 hr | 0.74 | 3.8 | 7.8 | 3.50 | 2.7 | 740 | 0.80 | 1700 | 95 |
| Comparative Example 3 | F-5 | 600° C. 4 hr | 1.11 | 1.35 | 5.82 | 3.32 | 1.95 | 712 | 1.37 | 1280 | 80 |

COMPARATIVE EXAMPLE 4

An electrochemical cell was prepared in substantially the same manner as described in Example 1 except that $(CF)_n$ which had been obtained by directly fluorinating a petroleum coke having a particle size of 10 to 15 μm which had not been subjected to heat treatment was used as the active material. The discharge characteristics of the electrochemical cell were measured in substantially the same manner as described in Example 1. The relationship between the discharge capacity and the potential, obtained from the results of the measurement, is illustrated as a curve IV in FIG. 13.

EXAMPLES 6 to 8

Figure 11:
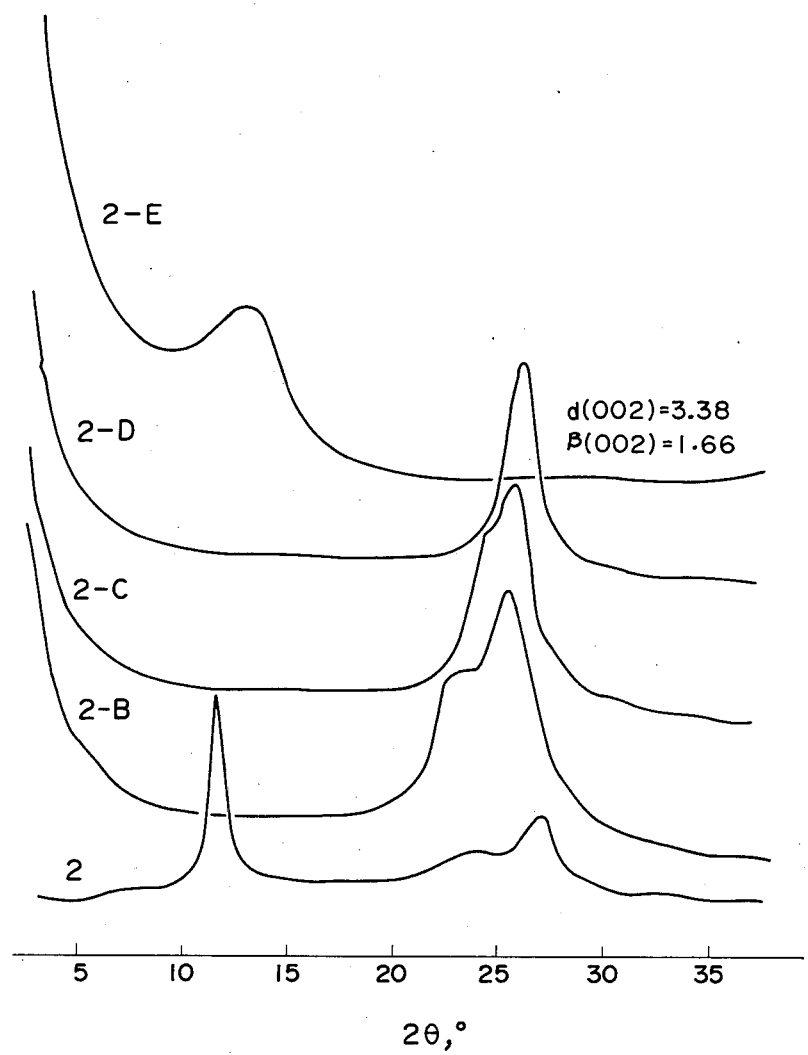
FIG. 11 shows the powder X-ray diffraction patterns of a graphitic oxide, a decomposition residual carbon obtained by decomposing the graphite oxide by heat, and a graphite fluoride obtained by fluorinating the decomposition residual carbon.

10 g of a natural graphite (20 to 50 mesh, Tyler) from Madagascar was mixed with 5 g of sodium nitrate and the resulting mixture was put in a flask. To the mixture in a flask was added 230 ml of sulfuric acid. To the resulting mixture was gradually added 30 g of polassium permanganate while stirring and cooling. Then, after the mixture was allowed to stand at 40° C. for 22 and a half hours, water was added to the mixture to generate hydration heat, thereby to increase the temperature of the mixture up to 98° C. and a reaction was effected at that temperature for 15 minutes. After completion of the reaction, flakes of a graphitic oxide were formed in the reaction mixture. The flakes were separated from the mixture by using a piece of gauze, and washed with alcohol. The thus obtained graphitic oxide was subjected to X-ray diffractometry. The obtained powder X-ray diffraction pattern is illustrated as a curve 2 in FIG. 9 and FIG. 11. The obtained graphitic oxide was heated up to 400° C. at a temperature elevation rate of 0.2° C./min. to effect the thermal decomposition of the graphitic oxide. Further, the thermal decomposition of the graphitic oxide was effected in vacuo at 400° C. for 2 hours and subsequently at 500° C. for 2 hours. After the thermal decomposition, the obtained decomposition residual carbon was subjected to an X-ray diffractometry. The powder X-ray diffraction patterns of a decomposition residual carbon obtained by heating up to 400° C. at a temperature elevation rate of 0.2° C./min, a decomposition residual carbon obtained by further heating in vacuo at 400° C. for 2 hours and a decomposition residual carbon obtained by still further heating in vacuo at 500° C. for 2 hours are illustrated respectively as curves 2-B, 2-C and 2-D in FIG. 11. Each of the above-mentioned decomposition residual carbons obtained by heating in vacuo at 500° C. for 2 hours was separately fluorinated at 450° C. for 2.5 hours, at 400° C. for 2.5 hours and at 350° C. for 4 hours, respectively. As a result, each graphite fluoride to be used in the present invention as an active material was obtained. The obtained graphite fluoride was subjected to an X-ray diffractometry. The obtained powder X-ray diffraction pattern is illustrated as a curve 2-E in FIG. 11.

EXAMPLE 9

Figure 16:
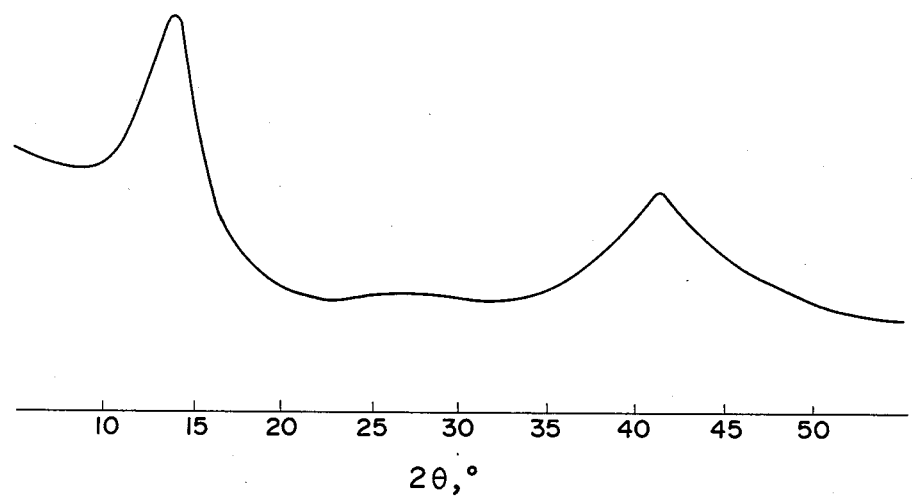
FIG. 16 shows the powder X-ray diffraction pattern of a graphite fluoride which is obtained by fluorinating, at 300° C., a decomposition residual carbon obtained by decomposing a graphitic oxide prepared from a heat-treated petroleum coke.

10 g of petroleum coke having a particle size of 10 to 15 μm which had been subjected to heat treatment at 2800° C. for 30 minutes was mixed with 5 g of sodium nitrate and the resulting mixture was put in a flask. To the mixture in a flask was added 230 ml of sulfuric acid and then, was gradually added 30 g of potassium permanganate while stirring and cooling. The mixture was allowed to stand at room temperature for 30 minutes. Then, water was added to the mixture to generate hydration heat, thereby to raise the temperature of the mixture up to 180° C. A reaction was effected at the temperature for 5 minutes. After completion of the reaction, water was further added to the mixture to lower the temperature of the mixture. As a result, a decomposition residual carbon was obtained. The obtained decomposition residual carbon was washed with water and vacuum dried at 400° C. for 2 hours. The thus obtained decomposition residual carbon was fluorinated in an atmosphere of fluorine at 300° C. for 25 hours to obtain a graphite fluoride. The thus obtained graphite fluoride was subjected to elementary analysis. As a result, the F/C ratio of the graphite fluoride was found to be 1.19. Also, the graphite fluoride was subjected to X-ray diffractometry. The obtained powder X-ray diffraction pattern is shown in FIG. 16. An electrochemical cell was prepared in substantially the same manner as described in Example 1 except that the above-obtained graphite fluoride was used as the active material. The discharge characteristics of the electrochemical cell were measured in substantially the same manner as described in Example 1. As a result, it was found that the discharge capacity was 870 mAh/g; the OCV, 3.42 V; the CCV, 2.29 V; the overvoltage, 1.13 V; and the energy density, 1730 VAh/kg. The discharge capacity, the OCV, the CCV and the overvoltage were measured at a constant-current discharge of 0.5 mA/cm².

EXAMPLE 10

Figure 17:
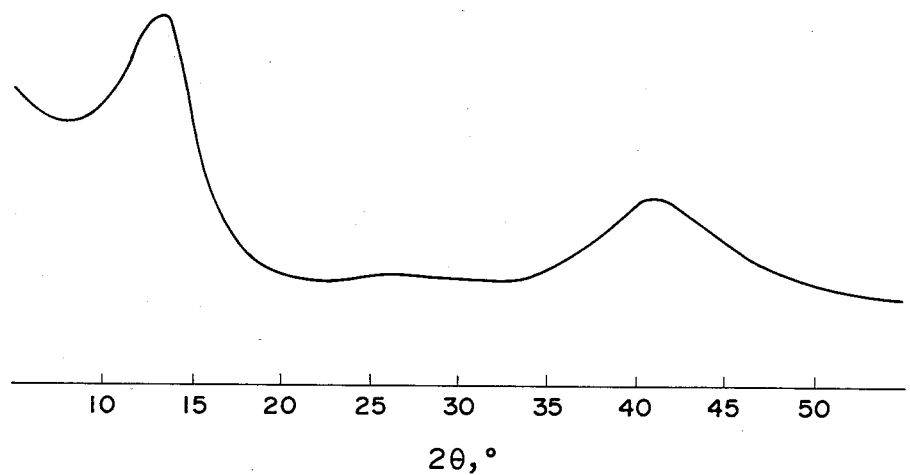
FIG. 17 shows the powder X-ray diffraction pattern of a graphite fluoride which is obtained by fluorinating, at 200° C., a decomposition residual carbon obtained by decomposing a graphitic oxide prepared from a petroleum coke which has not been subjected to heat treatment.

10 g of petroleum coke having a particle size of 10 to 15 μm which had not been heat-treated was mixed with 5 g sodium nitrate and the resulting mixture was put in a flask. To the mixture in a flask was added 230 ml of sulfuric acid and then, was gradually added 30 g of potassium permanganate while stirring and cooling. Then, after the mixture was allowed to stand at room temperature for 30 minutes, water was added to the mixture to generate hydration heat, thereby to raise the temperature of the mixture up to 180° C. A reaction was effected at the temperature for 20 minutes. After completion of the reaction, water was further added to the mixture to lower the temperature of the mixture. As a result, a decomposition residual carbon was obtained. The obtained decomposition residual carbon was washed with water and vacuum dried at 400° C. for 2 hours. The thus obtained decomposition residual carbon was fluorinated in an atmosphere of fluorine at 200° C. for 17 hours to obtain a graphite fluoride. The thus obtained graphite fluoride was subjected to elementary analysis. As a result, the F/C ratio of the graphite fluoride was found to be 1.28. Also, the graphite fluoride was subjected to X-ray diffractometry. The obtained powder X-ray diffraction pattern is shown in FIG. 17. An electrochemical cell was prepared in substantially the same manner as described in Example 1 except that the above-obtained graphite fluoride was used as the active material. The discharge characteristics of the electrochemical cell were measured in substantially the same manner as described in Example 1. As a result, it was found that the discharge capacity was 860 mAh/g; the OCV, 3.36 V; the CCV, 2.30 V; the overvoltage, 1.06 V. The discharge capacity, the OCV, the CCV and the overvoltage were measured at a constant-current discharge of 0.5 mA/cm$^2$.

COMPARATIVE EXAMPLE 5

Figure 18:
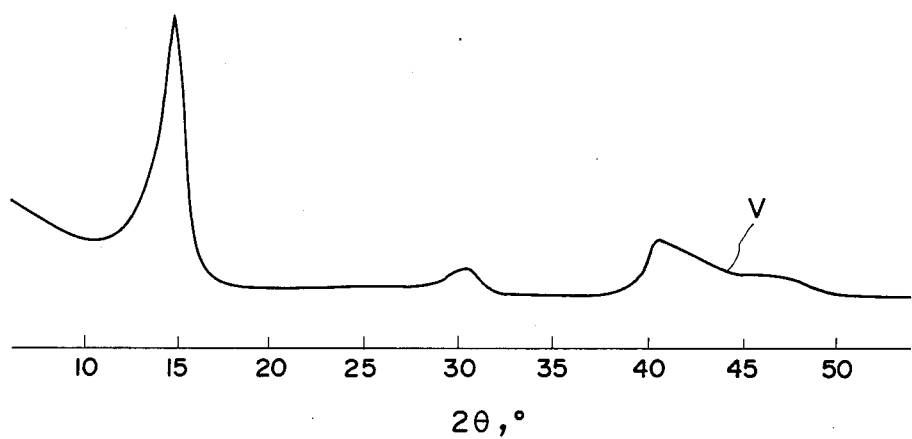
FIG. 18 shows the powder X-ray diffraction pattern of the conventional $(CF)_n$.
Figure 19:
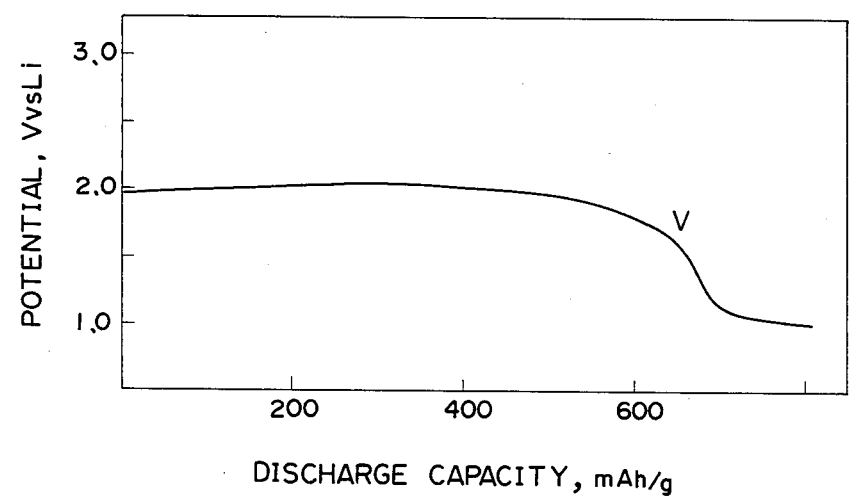
FIG. 19 is a graph showing the relationship between the discharge capacity and potential with respect to the conventional $(CF)_n$.

A natural graphite (150 to 200 mesh, Tyler) from Madagascar was fluorinated at 590° C. for 27.5 hours to obtain a conventional graphite fluoride $(CF)_n$. The thus obtained graphite fluoride $(CF)_n$ was subjected to X-ray diffractometry. The obtained powder X-ray diffraction pattern is shown in FIG. 18. An electrochemical cell was prepared in substantially the same manner as described in Example 1 except that the above-obtained graphite fluoride was used as the active material. The discharge characteristics of the obtained electrochemical cell were measured in substantially the same manner as described in Example 1. As a result, it was found that the discharge capacity was 800 mAh/g; the OCV, 3.30 V; the CCV, 1.98 V; and the overvoltage, 1.32 V. The discharge capacity, the OCV, the CCV and the overvoltage were measured at a constant-current discharge of 0.5mA/cm$^2$. Further, the relationship between the discharge capacity and the potential is shown in FIG. 19.

In the present invention, the X-ray diffractometry was effected using an apparatus for X-ray diffractometry JDX-8F type (manufactured and sold by Nihon Denshi Sha, Japan). Cu-K$\alpha$ line was obtained under the measuring condition of tube voltage-current at 30 kV-10 mA. Also, $^{19}$F-NMR analysis was carried out using an apparatus for NMR analysis WL109 type (manufactured and sold by Varian Co., Ltd., U.S.A.) under the measuring conditions of $H_O=3750G$ and $\nu=15$ MHz.

What is claimed is:

1. A method for producing a graphite fluoride for use in an electrochemical cell comprising a negative electrode having as the active material a light metal, an electrolyte, and a positive electrode having as the active material a graphite fluoride, which comprises
   (a) subjecting a crystalline or amorphous carbon to treatment with an oxidizing medium comprising a strong acid oxidant and water to obtain an oxidation reaction mixture containing a graphitic oxide,
   (b) decomposing the graphitic oxide by separating said graphitic oxide from said oxidation reaction mixture and heating said graphitic oxide to 200° to 400° C. at a temperature elevation rate of 1.0° C./min or less in an atmosphere of an inert gas or air and subsequently at 400° to 500° C. in vacuo, or by heating said oxidation reaction mixture at 120° to 230° C. to decompse said graphitic oxide in said oxidation reaction mixture, thereby obtaining a decomposition residual carbon, and
   (c) fluorinating the decomposition residual carbon.

2. The method according to claim 1, wherein the fluorination (c) is effected with fluorine at 20° to 550° C.

3. The method according to claim 1, wherein the decomposition (b) is effected by heating said oxidation reaction mixture at 120° to 230° C. to decompose said graphitic oxide in said oxidation reaction mixture, the heating of said oxidation reaction mixture being at least partially performed by hydration heat produced by adding water to said oxidation reaction mixture.

* * * * *

UNITED STATES PATENT AND TRADEMARK OFFICE
CERTIFICATE OF CORRECTION

PATENT NO. : 4,753,786

DATED : June 28, 1988

INVENTOR(S) : Nobuatsu Watanabe, et al

It is certified that error appears in the above-identified patent and that said Letters Patent is hereby corrected as shown below:

Col. 1, line 1
Col. 3, line 32          Correct --features--
Col. 12, line 5          Delete "$(C_2F)hd$" and substitute
                         --$(C_2F)_n$--
Col. 20, line 30         Correct spelling of --decompose--

Signed and Sealed this

Thirty-first Day of January, 1989

Attest:

DONALD J. QUIGG

*Attesting Officer*      *Commissioner of Patents and Trademarks*